Figure 1:
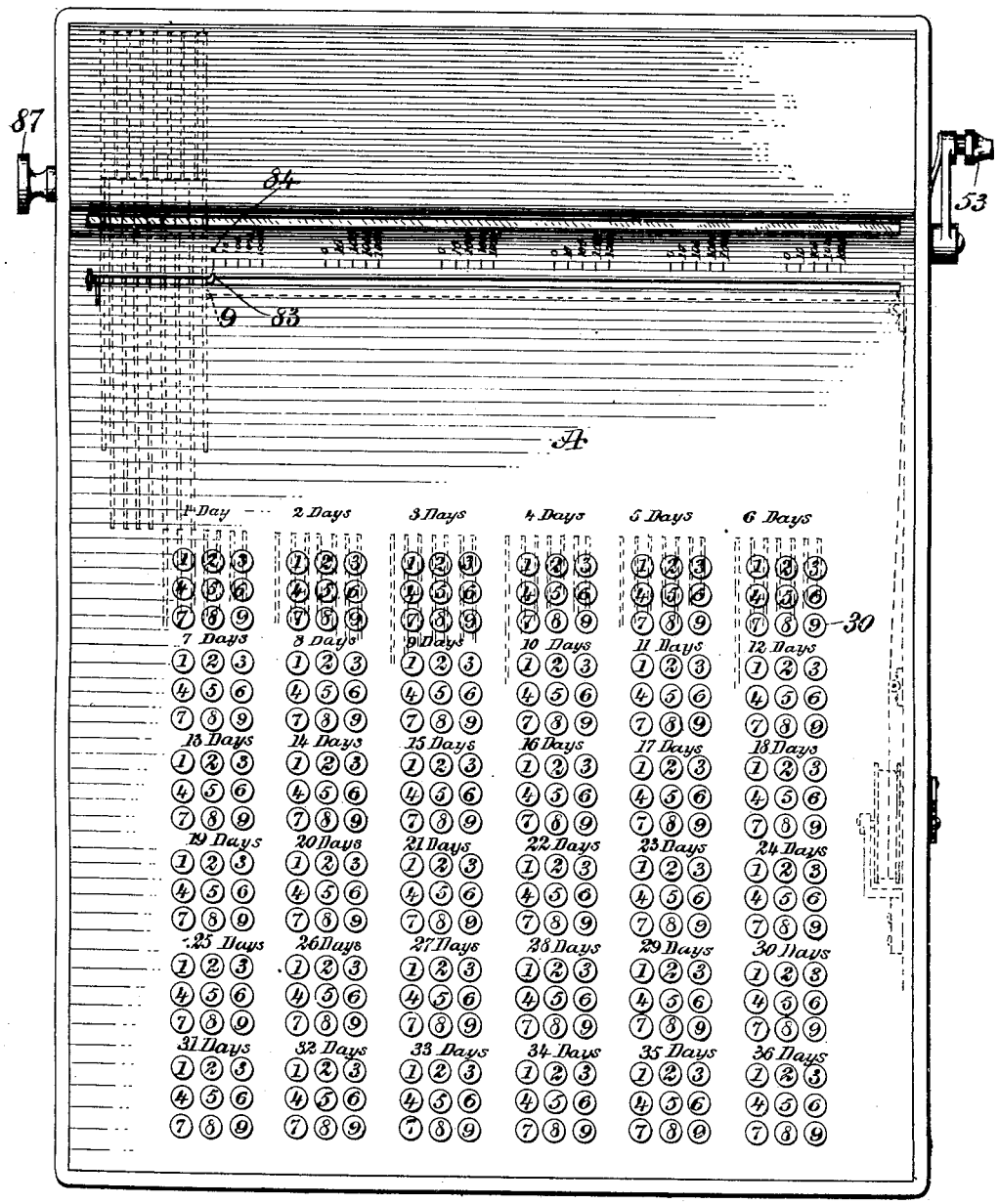

No. 823,219. PATENTED JUNE 12, 1906.
H. A. HENSLEY.
CALCULATING MACHINE.
APPLICATION FILED OCT. 20, 1903.

6 SHEETS—SHEET 1.

WITNESSES:

INVENTOR
Hubert A. Hensley
BY
ATTORNEYS

No. 823,219. PATENTED JUNE 12, 1906.
H. A. HENSLEY.
CALCULATING MACHINE.
APPLICATION FILED OCT. 20, 1903.
6 SHEETS—SHEET 2.
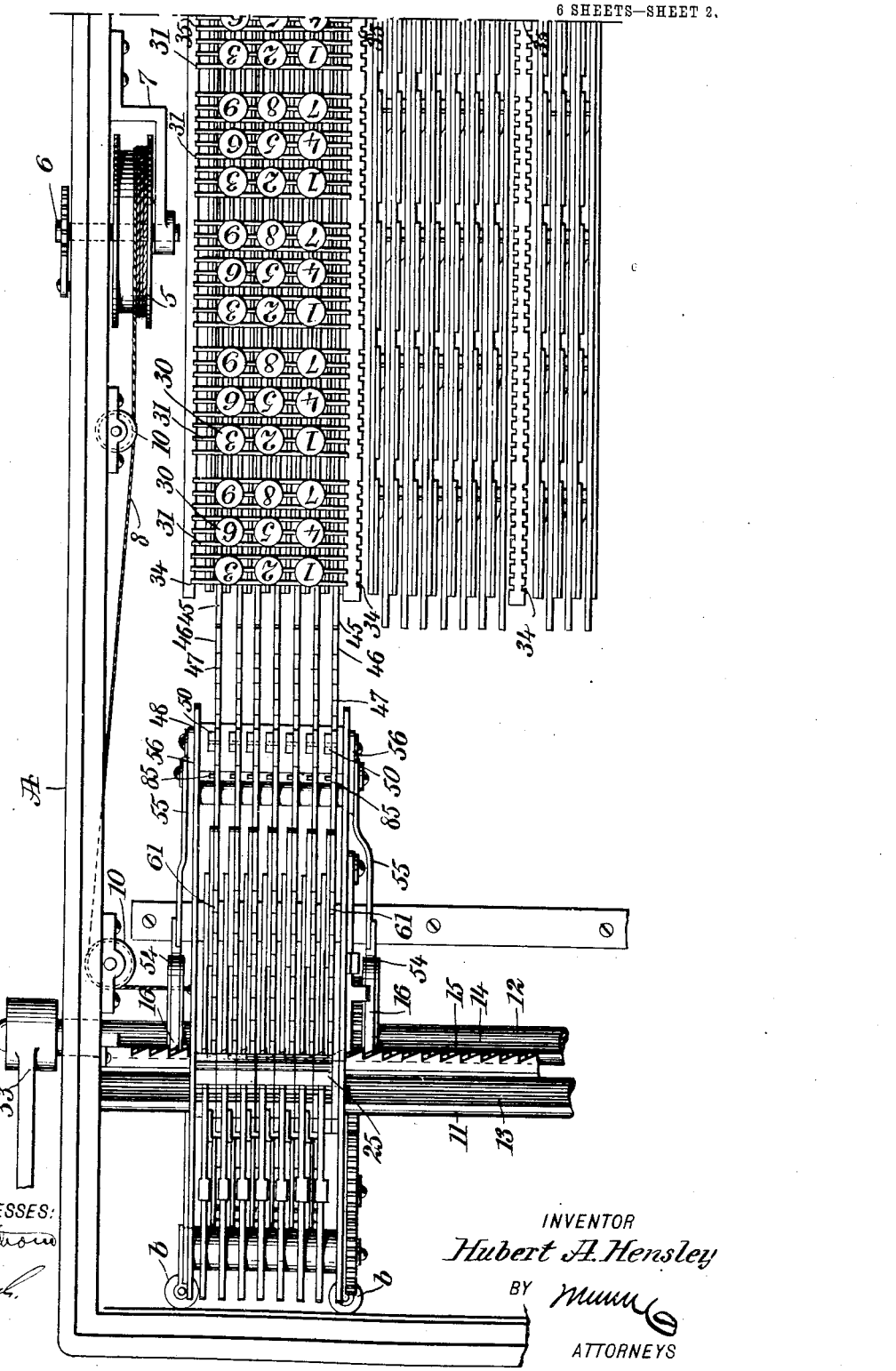
WITNESSES:
INVENTOR
Hubert A. Hensley
BY
ATTORNEYS

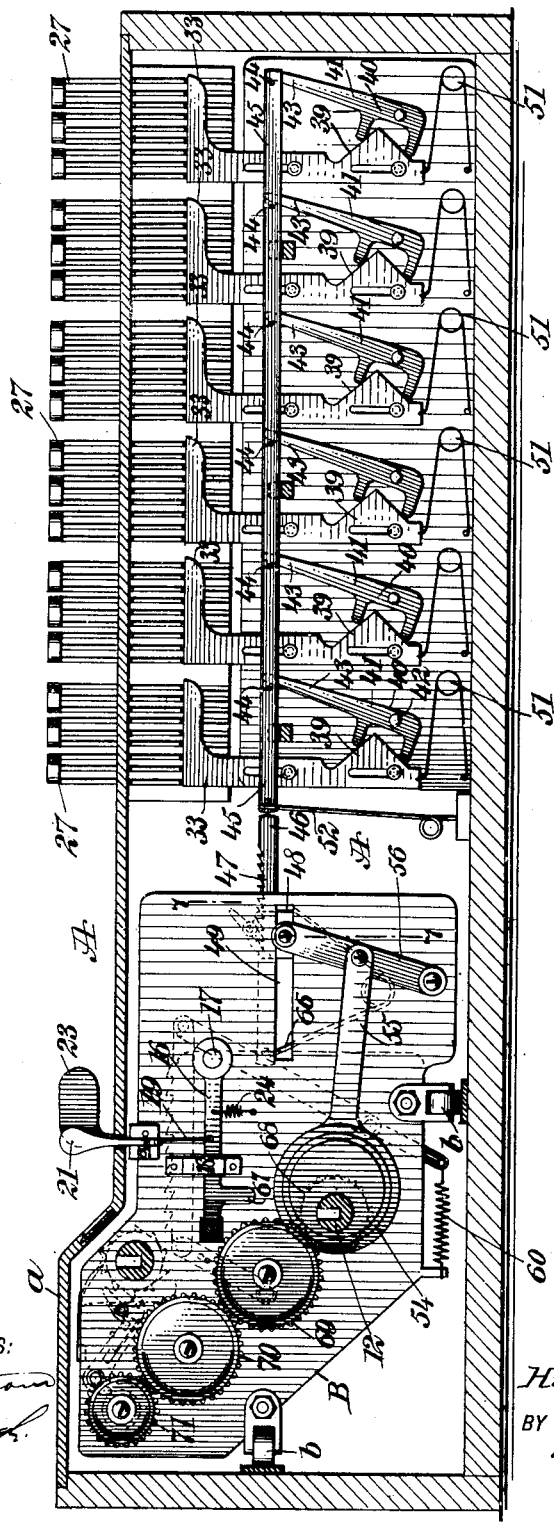

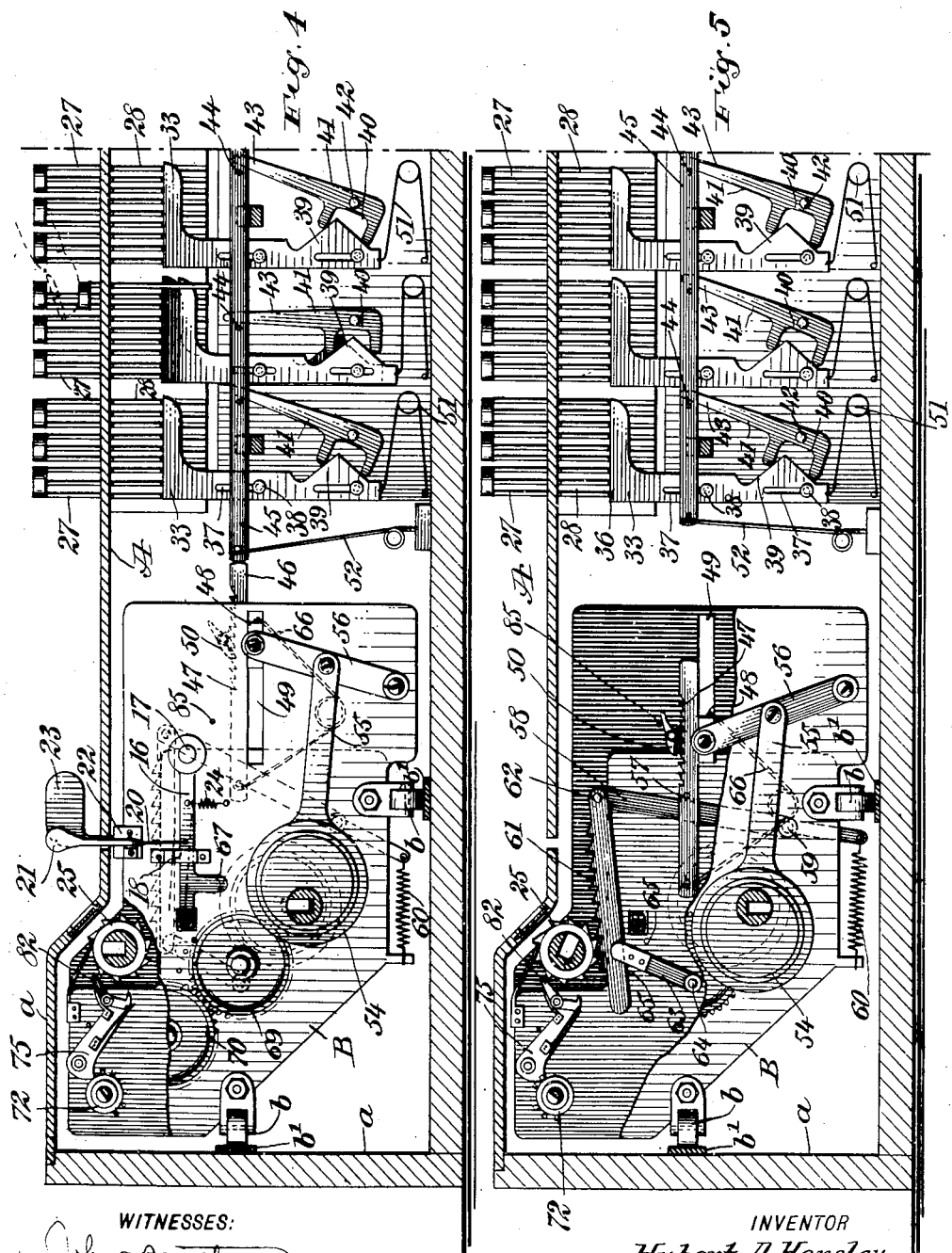

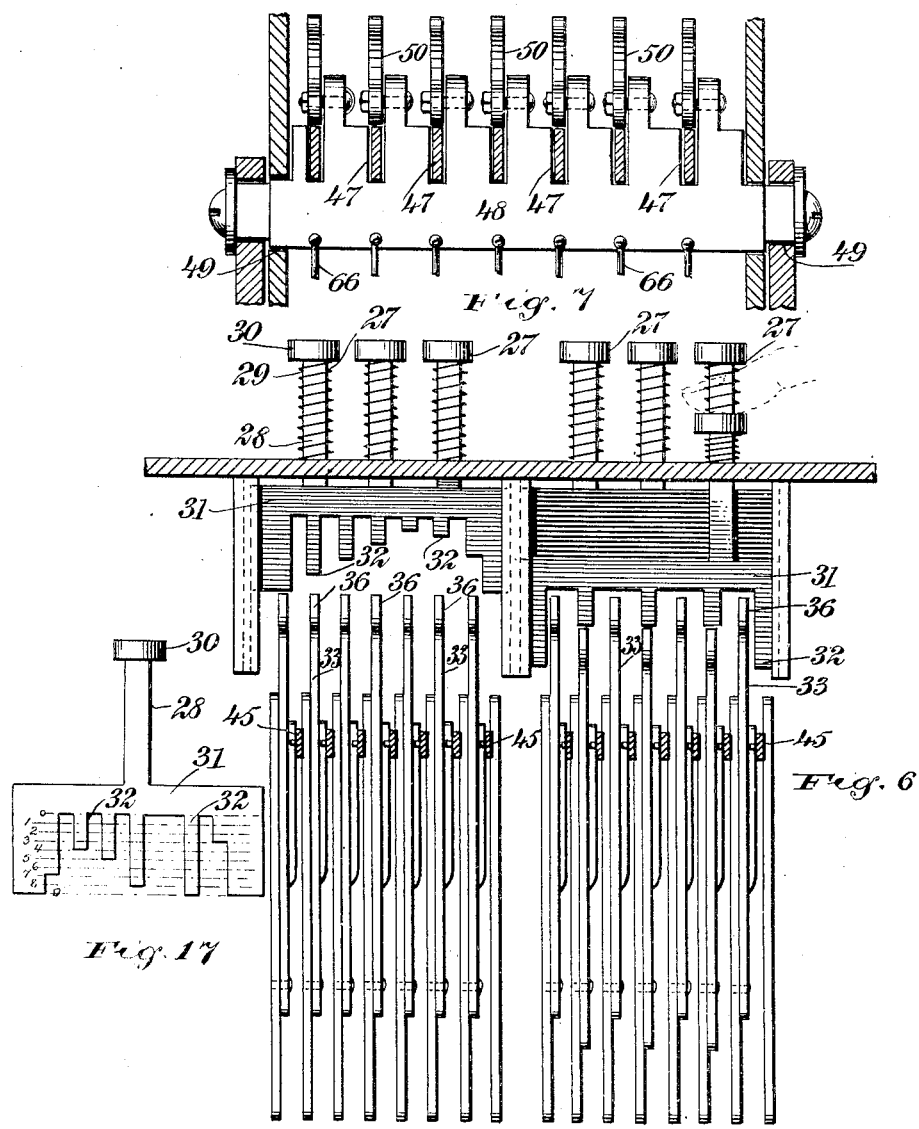

No. 823,219. PATENTED JUNE 12, 1906.
H. A. HENSLEY.
CALCULATING MACHINE.
APPLICATION FILED OCT. 20, 1903.
6 SHEETS—SHEET 6.
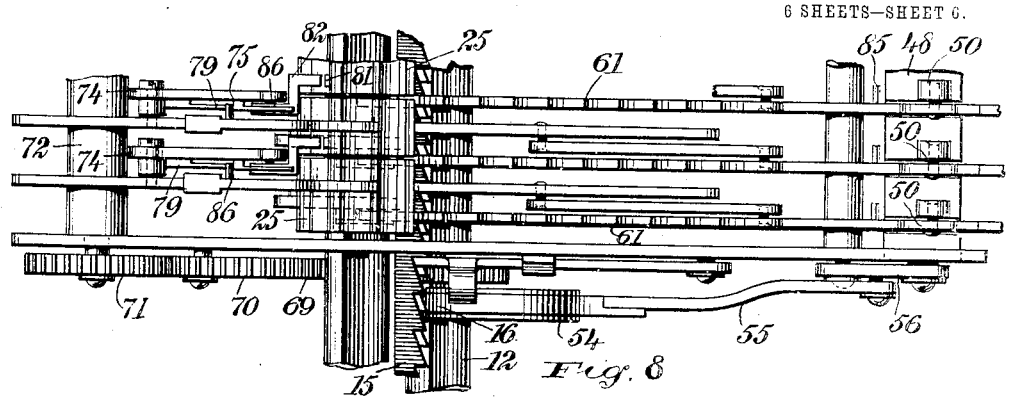
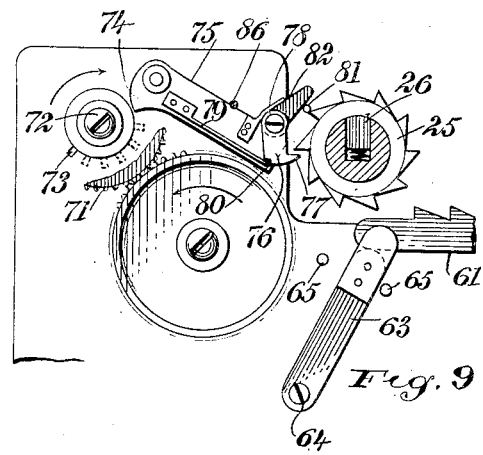
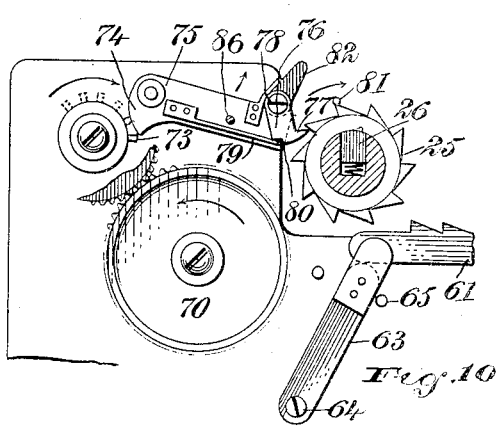
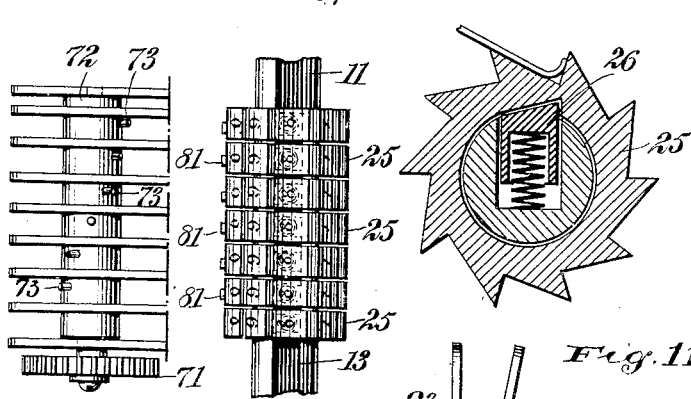
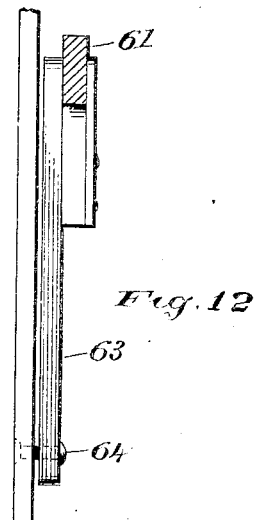
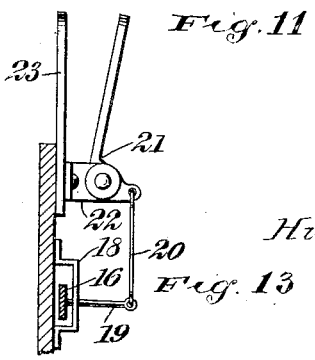
WITNESSES:
John A. Bergstrom
R. B. Cavanagh
INVENTOR
Hubert A. Hensley
BY Munn
ATTORNEYS

UNITED STATES PATENT OFFICE.

HUBERT A. HENSLEY, OF NEW ROCHELLE, NEW YORK.

CALCULATING-MACHINE.

No. 823,219.  Specification of Letters Patent.  Patented June 12, 1906.

Application filed October 20, 1903. Serial No. 177,745.

*To all whom it may concern:*

Be it known that I, HUBERT A. HENSLEY, a subject of the King of Great Britain, and a resident of New Rochelle, in the county of Westchester and State of New York, have invented new and useful Improvements in Calculating-Machines, of which the following is a full, clear, and exact description.

My invention relates to calculating-machines, and appertains particularly to certain novel and useful machines which are designed for use in calculating interest or moneys for certain periods, problems in exchange, and other matters of a like nature common in the commercial and financial world.

In the presence instance I have especially in contemplation the construction of a mechanism which will be particularly adapted for use in banking-houses and like establishments where it is necessary to daily calculate interest, problems in exchange, &c., on large sums of money, for by the use of my machine a large saving of time, effort, and general expenses will be attained.

Another object of my improvement is to provide a mechanism which will be compact, durable, and easily operated, the construction and correlation of the parts being such that the interest on a predetermined sum of money may be readily and quickly ascertained.

With the above-recited objects and others of a similar nature in view my invention consists in the construction, combination, and arrangement of parts, as is described in this specification, delineated in the drawings, and set forth in the annexed claims.

Reference is to be had to the accompanying drawings, forming a part of this specification, in which similar characters of reference indicate corresponding parts in all the figures.

Figure 1 is a top plan view of a machine constructed in accordance with my invention. Fig. 2 is a top plan view of a portion of my calculator, the top of the casing being removed to show the mechanism of the calculator. Fig. 3 is a longitudinal vertical sectional view taken through my improved calculator. Fig. 4 is a view, partly in elevation and partly in section, showing the position of certain of the operating parts when one of the keys is depressed at the beginning of the calculating operations. Fig. 5 is a similar view showing the operating parts after such key has been depressed and the parts have returned to their normal positions. Fig. 6 is a detail view of assembled keys, key-bars, and vertically-depressible operating-bars. Fig. 7 is a transverse vertical sectional view taken on the line 7 7 of Fig. 3. Fig. 8 is a top plan view showing portions of the traveling carriage of the machine and the means employed for controlling the movement of the same. Fig. 9 is a detail view of the mechanism employed for operating the counting-disks. Fig. 10 is another view of the same, showing the parts in the positions they occupy when in operation. Fig. 11 is a vertical sectional view of one of the counting disks or wheels. Fig. 12 is a detail view, partly in section, of the levers used in connection with the counting-disk-operating mechanism. Fig. 13 is a detail view of the finger-lever and connection used for releasing the locking-dogs holding the carriage whereby such carriage may be readily shifted across the machine. Fig. 14 is a detail view of the counting-disk shaft and the disks thereon. Fig. 15 is a detail view of the carrying-shaft. Fig. 16 is an illustrative view of an example in interest which may be performed with my machine, and Fig. 17 is a detail view of one of the key-plates used in the machine.

Referring now to the accompanying drawings, it will be noted that my machine comprises, generally speaking, a main casing containing a traveling carriage, the latter carrying a main shaft rotated by a crank-handle outside the casing, a second shaft having mounted thereon a plurality of counting disks or wheels, means on the traveling carriage designed when actuated to cause a certain predetermined number to appear on the disks at an opening formed in the casing, and a series of depressible keys and levers designed to put into operation the means for selecting a predetermined number on the counting-disks.

In the drawings, the letter A designates the boxing or casing of the calculator, which may be of any shape or form, though I have found a rectangular casing, such as is illustrated, to be preferable, the rear end *a* thereof being relatively higher or deeper than the remainder of the body portion to accommodate the carriage B, which is provided with small wheels or rollers *b*, resting upon the strips or tracks *b'*, said carriage being adapted to travel or be shifted laterally of the frame. This carriage is normally drawn from the left toward the right of the casing through the medium of a spring-tensioned drum 5, mounted upon a shaft 6, supported partially by one side of the casing and by a small bracket 7, this drum having wound thereon a cord 8, connected at one end with the carriage, as at 9 9, (see Figs. 1 and 2,) the cord passing over friction guide-pulleys 10 10. The carriage in its path of travel slides over the main shafts 11 and 12, journaled transversely in the casing, the shaft 11 having a groove 13 formed longitudinally thereof, while a similar groove is formed at 14 in the shaft 12. Extending across the machine between the two shafts is a toothed rack-bar 15, designed to be engaged by the dog-arms 16 16, pivoted at 17 17 to the sides of the carriage. A small clip 18 is used to limit the movement of each dog upon its pivot, and when it is desired to shift the carriage entirely across the machine without engaging with the teeth of this rack said dogs are elevated so as to clear the teeth by the wires 19 and 20, connected with the finger-lever 21, which protrudes through the top of the casing, said lever being pivoted to a bracket 22, secured to the finger-rest 23, the latter in turn being fastened to the side of the casing. A small contracting-spring 24 is provided for each dog to normally hold the same in engagement with the rack.

Slidably mounted upon the shaft 11 are a number of counting wheels or disks 25, each disk having on the periphery thereof numerals from "1" to "9", each of said disks also having a zero character marked thereon. The manner in which the disks are mounted upon the shaft is clearly shown in Fig. 11, for within the grooved portion of the shaft are a number of spring-tensioned pawls 26, one pawl being provided for each counting disk or wheel, so that said disk is normally held against rotation on the shaft until actuated by the means hereinafter described. As has been before stated, there are seven of these counting disks or wheels, as in any sums upon which it may be necessary to compute interest seven figures will be sufficient, for in the ordinary course of daily business the use of such number is rarely exceeded, though the number of disks may be increased, if desired. In order to compute the interest on any desired sum and to bring the proper characters indicating such amount of interest into view at the slot in the top of the casing, I have provided certain mechanism; but it is to be understood at the outset that the present machine is designed for computing interest at six per cent. for any number of days up to thirty-six at one writing of the principal sum upon the keys, and it will of course be evident that by mechanical changes in the machine and the arrangement of the keys and their accessories, to be hereinafter described, the machine may be made to compute any amount or rate of interest. In this particular machine, where calculations are required of interest for a longer period than thirty-six days and not exceeding one year, it will be necessary to write the principal sum twice upon the keys.

The present machine is one of the class commonly known as "key-operated," and I will now proceed to describe the construction of the operating mechanism and the manner of using the same when computing the interest upon a certain sum.

The machine is provided with a series of keys 27, the shanks 28 of which protrude through the top of the casing, and said keys are normally held in a certain raised position through the medium of coiled springs 29. Upon the head portion 30 of each key is a number designating the value of the digit the percentage upon which such key when depressed is designed to record, and there are nine such numbers in each series or groups of keys. As will be apparent upon examination of Fig. 1, the machine is designed to compute interest for thirty-six days, and there are thirty-six groups or series of keys, one group for each day, and, as stated, there are nine keys to a group, or nine keys for each day marked upon the machine. The shank 28 of each key extends into the casing and carries at its end a key-plate 31, said plate being substantially rectangular in shape and having cut therein a plurality of teeth in number corresponding with the number of counting-disks used—in the present instance seven—said teeth being indicated by 32. These teeth 32 vary in length, so that when a certain key is depressed the plate 31 of said key will move downward and contact with one or more, and sometimes all, of the vertically-movable lever-operating bars 33 in that particular section, said plate 31 being guided in its movement by a pair of the grooves or notches 34, formed in the guide-rods 35 35, which extend longitudinally of the machine and divide the series of keys into six sets.

The bar 33 is formed with a head portion 36, extending at an angle to the main body of the said bar, having therein a plurality of longitudinal slots 37 37, through which project the pins 38 38, so that the movement of said bar is limited. When one of the keys is depressed, the triangular projecting portions 39 of all the bars contacted by the teeth of the plate 31, which is correspondingly depressed, engage with the bifurcated head portions 40 of the levers 41, which are pivoted at 42 in the frame of the machine, and the toe portions 43 being swung forward contact with the pins 44, carried by pusher-rods 45, and throw said rods forward into contact with one end 46 of toothed rods 47, the latter rods being slidably mounted upon the carriage through the medium of blocks 48, sliding in slots 49, cut in the frame of the carriage.

The teeth in any given plate are of such relative lengths that they express a number, predetermined for each plate. Thus if a tooth one-eighth of an inch long expressed the figure "1," a tooth one-quarter of an inch long would express the figure "2," and one three-quarters of an inch long would express the figure "6," and so on. If no tooth appeared on the plate, but merely a vacancy where a tooth might have been, zero is expressed. Hence if it were desired to represent the number "7,458,093" on such a plate it would appear as in Fig. 17. The mechanism is so designed that the particular number "7,458,093" may appear on the dial; but in practice, however, it is not necessary that all the figures represented by a plate be recorded, and the dial in its sliding movement, as aforesaid, is so regulated as to record only the numbers that are required.

In their normal condition the dials are all assembled so that the zero-sign on all shows through the slot, and at the commencement of a calculation the indicator 83, Fig. 1, should be placed at the zero-mark of the scale 84 of the section which contains the keys which are to be used. All the figures on the three dials farthest to the right should be in a different color from the figures on the rest of the dials, as the figures on these three dials always represent decimals. On reference to Fig. 1 it will be seen that when the indicator 83 of the dials stands at zero the three right-hand dials, or the decimal-figures, are represented opposite the three teeth of any plate in that section which are farthest on the left. Hence if in our calculation with the indicator 83 standing at zero we should depress the key which controlled the plate shown in Fig. 17 the numbers appearing on the dial when the mechanism had completed its movement would be "745," all decimals. The balance of the numbers, not being necessary in the calculation, do not appear. Had the operation been begun with the indicator 83 pointing to number "10" in the scale 84 the figures on the dial would have been 7.458." If the indicator had pointed to "100" on the scale, the result on the dial would have been "74.580." Hence it appears that the result of moving the carriage one degree of the scale to the right is to multiply the number to be recorded by ten or to move the decimal-point one place to the right.

The mechanism of the device is such that after a number has been recorded on the dial it moves the carriage one degree of the scale to the right. Further, the mechanism is such that, as explained in detail below, when several keys are depressed in succession and the operating-crank has been actuated the resultant number on the dial is the sum of all the numbers which would have appeared individually on the dial if each operation had been conducted as a separate calculation.

Suppose now we depress the key controlling the plate shown in Fig. 17 a number of times in succession. Let the indicator of the dial 83 point to zero on the scale 84. After the first depression and full movement of the mechanism the figures ".745" would appear in the dial; but the indicator would also have moved a degree to the right. Hence at the second depression of the key the number to be added would not be ".745," but "7.458," and at the end of the full movement the sum of these, or "8.203," would appear, while upon the next movement the result at the dial would be "82.783," the carriage also traveling a degree farther to the right, and so on.

In order that my invention may be clearly understood, I will select a specific example and employ a sum in describing the construction and operation of the machine. Assume, for instance, that we require the interest on ninety-five thousand six hundred and eighty-four dollars for seven days at six per cent. We would place the traveling dial opposite the space on the keyboard marked "7 days," with the indicator 83 pointing to zero on the scale 84 and all the disks showing zero in the slot. This space marked "7 days" has nine keys, each of which controls a particular plate whose serrations indicate predetermined numbers. In this instance these plates would be toothed to indicate numbers according to the following table: Plate No. 1 would be serrated to indicate "0011666," plate No. 2 would be serrated to indicate "0023333," plate No. 3 would be serrated to indicate "0035000," plate No. 4 would be serrated to indicate "0046666," plate No. 5 would be serrated to indicate "0058333," plate No. 6 would be serrated to indicate "0070000," plate No. 7 would be serrated to indicate "0081666," plate No. 8 would be serrated to indicate "0093333," plate No. 9 would be serrated to indicate "0105000," which numbers indicate the interest for seven days at six per cent. on the digit to which each, respectively, refers. Thus in the case of the digit 4 the interest is .004666; but it is plain that the interest on ten times four, or forty, is expressed in the same figures, or 0.046666, by simply moving the decimal-point one place to the right, or multiplying by ten. Similarly, the interest on four hundred is 00.46666, and so on, which makes clear the office of the traveling dial. In the specific example given interest is calculated on a basis of three hundred and sixty days to the year. In our example, then, we first press the key marked "4" in the space marked "7 days." As explained above, we require only the three first figures when the calculation is in the place of units. Hence the number which should appear on our dial is ".004," all decimals. The mechanism accomplishes this as follows: The depression of the key causes the vertical bars 33, contacted by the plate corresponding to the key marked "4," to be forced downward, as described, and the projecting portions 39 thereof engaging with the pivoted levers 41 push the toe of the same forward, and as the latter contacts with one of the pins 44 upon said rods the rods are pushed forward a certain distance until they contact with the bars 46, having the notches 47 therein. These slide-bars are in turn pushed forward a distance which will cover a number of the notches equal to the number which the respective engaging teeth represent. Thus as the number we wish to appear on the dial is "004" the first and second bars will not advance at all, but the third bar will advance until the pawl 50, which is attached to the sliding block 48, drops into the fourth notch, locking the same against backward movement. The key is then released and is raised through the spring 29, and the pressure being removed from the bars 33 the latter are returned to position by springs 51 and the rods 44 are forced back into their normal inoperative position away from the bars 46 through the medium of the long plate-spring 52, secured on the bottom of the casing and contacting with said bars. The pawl 50 is left in engagement with the fourth notch of the bar 46, and the shaft 12 is then given a rotation or turn through the medium of a crank-handle 53, secured to one end of the shaft, projecting through the side of the casing. Keyed to this shaft 12 are the eccentric cams 54 54, one at each side of the carriage, each of said cams having an arm 55, which arm is in turn connected with a link 56, pivoted at its lower end to the carriage, the upper end of said link being connected with the sliding blocks 48 of the notched bars 46. The normal inoperative position of the eccentric cams and their connections are shown in Fig. 3. When the cam has made a partial revolution, owing to the impulse of the shaft, as shown in Fig. 5, the blocks are pulled forward in their slots, carrying with them the bars 46, said bars having pins 57, which contact with the vertical levers 58, pivoted at 59 to the carriage, said levers being pushed forward by the pins against the tension of springs 60, connected to the lower end of the lever and at the base of the carriage. When the lever 58 is contacted by the pin 57 of the forwardly-sliding bar 46, it is thrown forward and gives an impulse to the toothed rack-bar 61, which is pivoted to the lever 58 at the point 62, the teeth on the bar 61 engaging with the teeth of the counting-disks 25, this bar 61 being guided in its forward and upward movement by a supporting-strip 63, pivoted at 64 to the carriage, the path of movement of said supporting-strip being limited by the small pins 65 65. When the teeth of the bars 61 engage with the counting-disks, they cause the predetermined number to appear at an opening in the face of the casing, and in the present instance the key-bar "4" of the seventh-day series having been depressed the characters appearing at said opening will be "004." The completion of the revolution by the crank-handle 53 restores the large cams and the sliding blocks and links to their former positions. Meantime at the end of the forward movement of the bar 46 the pawl 50 has come in contact with a projecting pin 85, disengaging the pawl from the teeth of the bar 46, and the latter is forced back to its normal position by the spring 66, (see Figs. 4 and 5,) while the contracting-spring 60 hereinbefore described pulling upon the end of the lever 58 restores the bar 61 to its original position, and the machine is ready for the depression of the key representing the next digit in the proposed principal sum. Upon the upward movement of the cams 54 the one nearest the locking-dogs 16 of the carriage-holding mechanism is brought into contact with a small depending lug 67 on the locking-dog, and as the cam continues its upward movement it raises or lifts the locking-dog from engagement with the teeth of the rack 15, and the carriage is jumped or shifted one space to the right by means of a spring-drum and cord. The completion of the revolution of the crank-handle has caused the interest on four dollars to be recorded on the dial and has also moved the dial one space to the right. The next step in the calculation is to depress the key marked "8." Referring to the table of predetermined numbers, we find that appertaining to the figure "8" is "0093333;" but the number on which we require the interest is eighty dollars instead of eight dollars, and this is the reason why the traveling dial must move one degree to the right after each operation. If now we depress the key marked "8," we will find that four figures of the above number are presented and in readiness to be recorded on the dial—namely, "0.093"—that is, three decimal places, as before, and the number to the left of the decimal-point. On completing the revolution of the crank-handle 53 the dial will show ".004 + 0.093," or "0.097," while the dial will have again moved a degree to the right ready to record the interest on the next digit 6. This, owing to the fact of the dial having moved two places to the right, now becomes "$600," and the interest, "00.700" is added to the previous result. Here it will be noticed have again been added the three places of decimals; but this time there are two numbers on the left of the decimal-point. In fact, after each operation there will appear an additional figure on the left of the decimal-point. The dial now should show a total of "00.797." Similarly, the interest on five thousand dollars (005.8333) and on ninety thousand dollars (0105.000) are added, and the final result shown on the dial will be "0111.630," as shown in Fig. 16, and is as follows:

| Interest on | $4 | .004.6666 |
|---|---|---|
| Interest on | 80 | 0.093.333 |
| Interest on | 600 | 00.700.00 |
| Interest on | 5,000 | 005.833.3 |
| Interest on | 90,000 | 0.105.000 |
| Total | | $0.111.630 | the numbers on the right of the vertical line being the superfluous numbers, which are not recorded.

In the course of the repeated additions above mentioned it must necessarily occur that one or more of the disks is made to turn more than a complete revolution, which necessitates the providing in the mechanism of this machine for the carrying of the figure which is dropped as such a wheel commences its new revolution. This figure of course must be taken up by the disk next on the left, and the mechanism accomplishing this is as follows:

Secured to the same shaft as that carrying the eccentric cams 54 a small gear-wheel 68 (see Fig. 3) is designed to turn with said shaft and transmit motion through the intermeshing gear-wheels 69 and 70 to the gear-wheel 71, which is of the same size and contains the same number of teeth as the gear-wheel 68, this gear-wheel 71 being mounted upon a shaft 72 at the upper end of the machine, said shaft being adapted to be turned through the medium of the train of gearing just described. Carried by said shaft 72 and spaced apart thereon are a number of projecting studs 73, in the present instance six studs, or one for each counting-disk except that on the left, which of course does not require one, as there is no disk for it to carry to. Corresponding with each of these studs 73 is a pivot-bar 75, (see Fig. 9,) against the heel 74 of which the corresponding stud 73 is designed to contact at a certain period in the revolution of the shaft 72. At the outer end of each bar 75 is pivoted an angular locking-pawl 76, having a tooth 77 in position where it can be made to engage one of the counting-disks 25. This locking-pawl is not wholly in the same plane; but its shape is such that the angular arm 82 is presented at the disk next on the right of the disk to which the tooth is presented, as will appear on reference to Figs. 9 and 10. Carried by each of the counting-disks is a small projection 81, which is placed on a division of each disk presenting the same figure and which is so arranged that when a disk has made a complete revolution and it becomes necessary to carry a figure over the next disk the projection 81 comes in contact with the angular arm 82 of the pawl 76, and as the disk continues to turn it presses the arm of the pawl backward, so that the tooth 77 is in a position to engage with the counting-disk presented to it. Thus if the arm of the pawl were pressed back by the projection 81 on the counting-disk farthest on the right the tooth 77 of the pawl would engage the counting-disk next to the one on the right. The pawl is kept in its normal position, which is with both the angular arm 82 and tooth 77 clearing the counting-disk by a pressure-spring 78, secured to the bar 75, and also by a flat spring 79 engaging with a shoulder 80 of the pawl. When the projection 81 presses the arm of the pawl backward, this flat spring 79 catches in a notch or shoulder 80 of the pawl and keeps the pawl fast in a position ready to engage the disk to which it is presented. Upon the rotation of the shaft 72 one of the pins 73, carried thereby, contacting with the heel 74 of the bar 75 forces said bar upward on its pivot and causes the tooth 77 of the angular locking-pawl 76 to positively engage with one of the teeth of the counting-disk, moving said disk forward one space. All of the pins 73 will contact in turn the respective bars 75 and whenever the projection 81 has caused the pawl 76 to be in position for engaging a disk said disk will be moved around one space—that is, a carry-figure 1 will have been added. As the bar 75 is forced upward by the contact of the pin 73 against its heel 74 the flat spring 79, which keeps the tooth 77 of the pawl 76 in position of engagement at the end of the movement, comes in contact with a projection 86, which releases the tooth 77 and allows the pawl 76 to return to its normal position.

After the final result has been obtained in any calculation the disks must be assembled, so that they all stand at zero in the slot. For this purpose the milled head-wheel 87 at the left end of the shaft 11 in Fig. 1 is used to turn said shaft in such direction as to cause the spring-tensioned pawl 26 in each of the counting-disks 25 to engage and hold all the wheels, so that the numbers presented by all the disks shall be the same. By continuing to turn, so that the figure presented at the slot will be the character zero, the disks will be in position for the next operation. It will be obvious that if one of the figures of the principal sum be zero no key need be depressed, but one revolution of the handle must be given to bring the next number to its proper position.

As herein stated, I do not confine myself to a machine for calculating interest; but such machine may also be employed for calculating exchange—that is to say, by making the necessary change in the keys and plates and marking each series of keys with characters indicating the rate of exchange—for instance, for francs or marks—the value of a certain sum of francs or marks may be ascertained in dollars and cents, and vice versa. In other words, given two propositions between which there is a ratio which can be expressed decimally they can be expressed in terms either of the other by means of this device. Thus the machine may readily be arranged so as to reduce interest from six per cent. to any other rate desired and predetermined. It is also designed that that portion of the machine which comprises the keys and the predetermined plates may be detachable, so that the rest of the machine may be used for recording one or more series of calculations by simply superimposing a different set of keys and plates of the same size and design, but with the plates serrated for another variety of calculation. Thus one set of keys and plates might calculate interest, and these having been removed another set might be placed in position which would reduce the interest to any desired rate, and yet another might figure francs and the like.

While I have shown and herein described one particular embodiment of my invention, it is of course to be understood that I do not limit myself to the precise details of construction shown herein, as there may be modifications and variations in certain respects without departing from the essential features of the invention or sacrificing any of the advantages thereof.

Having thus described my invention, I claim as new and desire to secure by Letters Patent—

1. In a calculating-machine, the combination with counting mechanism, of digit-indicating devices, each denoting a certain number to be multiplied, and mechanism controlled thereby, including an element denoting a predetermined multiplier, for multiplying the selected number by said predetermined multiplier.

2. In a calculating-machine, the combination with counting mechanism, of a plurality of groups of digit-indicating devices, each denoting a certain number to be multiplied, each group being provided with mechanism for multiplying a selected number by a predetermined multiplier, the multipliers of the several groups differing from each other.

3. In a calculating-machine, the combination with a plurality of groups of digit-indicating devices, each denoting a certain number to be multiplied, of counting mechanism, and a traveling carriage on which the mechanism is mounted, whereby such counting mechanism may be brought into position to be operated by any of said groups.

4. A calculating-machine comprising a casing, a carriage movable therein, a plurality of counting-disks, a plurality of depressible keys, and means, including a serrated plate carried by each key, interposed between the keys and the counting-disks and operated by the depression of the keys for causing a predetermined number to be indicated by the counting-disks.

5. A calculating-machine comprising a casing, a movable carriage, counting mechanism, a key, and calculating means including means representing time and other means representing rate per cent. interposed between the key and the counting mechanism adapted upon the operation of the key, to calculate a desired proportion of a determined amount, such proportion being indicated by the counting mechanism.

6. A calculating-machine comprising a casing, a carriage therefor, means for imparting movement to the carriage, a shaft extending through the carriage, counting-disks on the shaft, and means for calculating a desired proportion of a predetermined amount and causing said proportion to be exhibited by the counting-disks, said last-mentioned means including means representing a definite period of time.

7. A calculating-machine comprising a casing, a carriage movable therein, a plurality of counting-disks, groups or series of depressible keys, a serrated plate carried by each key, and means for causing a predetermined number to be indicated by the counting-disks, such means including mechanism adapted to be placed in operation by contact of certain of the serrations of one of the plates with such mechanism, and means for rotating the disks.

8. A calculating-machine comprising a casing, a carriage movable therein, a shaft extending through said casing, counting devices within the casing, and means for operating said devices to cause a certain number to be indicated thereby, said means including a movable key, an element having serrations of different length carried by the key, a bar in the casing adapted to be actuated by the movement of the key, means interposed between the bar and the counting devices designed to be actuated by the movement of the bar for selecting the number to be shown, and means for causing the counting devices to be rotated to cause the predetermined selected number to appear at the opening in the casing.

9. A calculating-machine comprising a casing, a carriage movable therein, counting devices within the casing, and means for operating said devices to cause a certain number to be indicated, such means including a depressible key, a serrated plate carried by said key, a bar within the casing designed to be moved by contact with a serration of the plate, a pivoted lever arranged to be moved by said bar, a pusher-rod actuated by said lever, means actuated by the movement of the rod for selecting the number to be indicated, and means for actuating the counting devices to cause said selected number to appear at an opening within the casing.

10. A calculating-machine comprising a casing, a carriage movable therein, counting devices within said casing, and means for operating said devices to cause a certain number to be indicated, such means comprising a depressible key, a serrated plate carried by said key, a bar within the casing designed to be moved by contact with a serration of the plate, a pivoted lever adapted to be moved by said bar, a pusher-rod actuated by said lever, a sliding toothed bar mounted on the carriage and adapted to be moved by the pusher-rod, means for engaging with certain of the teeth of the sliding bar for holding the latter against movement, and means for rotating the counting devices to cause a certain number to appear at an opening within the casing.

11. A calculating-machine comprising a casing, a carriage movable therein, a shaft journaled in said casing, counting devices carried by said shaft, a second shaft journaled in said casing, and means for causing a predetermined number to be indicated by the counting devices, said means including a key-actuated element having projections of different length for selecting the number to be indicated, and mechanism between the second-mentioned shaft and the counting devices and put into operation by the rotation of said second shaft, whereby such predetermined number will be caused to appear at an opening in the casing.

12. The combination with a casing and a movable carriage therefor, of a shaft journaled in said casing, counting-disks carried by said shaft and designed to be moved along said shaft with the travel of the carriage, key-actuated means for selecting a certain number on one of said counting-disks, a second shaft journaled in the casing, means for rotating the second shaft, mechanism interposed between the second shaft and the counting-disks for causing certain of said disks to be rotated to exhibit a number previously determined upon, and means for moving certain other of said disks to add to the number selected.

13. The combination with a casing and a movable carriage therefor, of a shaft journaled in said casing, counting-disks carried by said shaft and adapted to be moved along the shaft with the travel of the carriage, key-actuated means for selecting a certain number on one of the counting-disks, a second shaft, an eccentric mounted on the second shaft, and mechanism interposed between the eccentric and the counting-disks and operated by the movement of the eccentric and its shaft to engage with the counting-disks and cause the predetermined number to appear.

14. The combination with a casing, a movable carriage and counting-disks, of means for causing a certain number to be exhibited by said disks, such means including mechanism for selecting said number, and means for rotating the counting-disks to cause said number to appear at an opening in the casing, said latter means comprising a rotatable shaft journaled in the casing, an eccentric mounted on the shaft, and a toothed sliding bar operated by the movement of the eccentric and adapted to engage with a certain one of said counting-disks, the construction being such that said disk will be turned by the toothed bar to cause the number to appear at an opening in the casing.

15. The combination of a casing, a carriage movable therein, counting-disks, key-actuated means for selecting a certain number on one of the counting-disks, mechanism for rotating the counting-disk to cause said number to appear at an opening in the casing, such mechanism including a pivoted lever, a depressible bar contacting therewith, and a sliding bar movable by contact with the lever, and means for actuating certain other of said counting-disks to add to the said number, such means including a tripping and holding device pivoted to the carriage and adapted to engage with a counting-disk, and means for releasing and operating the tripping and holding device to cause certain of the disks to rotate.

16. The combination of a casing, a carriage movable therein, counting-disks within the casing, means for selecting a number on one of said counting-disks, such means comprising an element having a determined value in connection with the number selected, means for causing such number to appear at any opening in the casing, and means for adding a number to the selected number, such means including a tripping and holding device pivoted to the carriage, a shaft journaled in the carriage adjacent to the tripping and holding devices, means carried by the shaft adapted to engage with the device to throw the same into engagement with the counting-disks and cause said device to move the disks to exhibit the number, and a stop-pin adapted to contact with the tripping and holding device for releasing the latter and permitting it to return to its normal position.

17. A calculating-machine comprising a casing, a carriage movable therein, means for imparting a step-by-step movement to the carriage and locking the latter after each step, counting devices within the casing and movable with the carriage, means for selecting a certain number on said counting devices, means for causing the movement of said devices to expose a certain number, said means including a shaft journaled in the frame, means actuated by the rotation of the shaft for moving the devices, and means for adding a number to the number first exhibited by the devices, such adding means including a tripping device, means for actuating said tripping device to cause the latter to engage with the counting devices and move the last-mentioned devices to expose a new number, gearing between the rotatable shaft and the trip-actuating means for operating the latter, and means for returning the tripping device to its normal position.

18. A calculating-machine comprising a casing, a movable carriage, counting-disks, mechanism expressive of a percentage or proportion of a determined amount adapted to be placed in operative connection with said disks, means for actuating the disks to cause such proportion or percentage to be exhibited, and means for causing additions of other numbers or expressions to be made to the proportion or percentage expression first shown on the disks, said latter means comprising a device adapted to engage with certain of the disks, and means for actuating the device to cause the rotation of the disk engaged.

19. The combination of a casing, a movable carriage therefor, a plurality of movable counting-disks, means for actuating certain of said disks to cause a desired number to be exhibited by the disks, and mechanism, adapted on a subsequent operation of the machine, to cause additions to be made to the number first exhibited by the disks, such mechanism including a horizontally-disposed shaft provided with a plurality of projecting pins, a tripping device, comprising a pivoted bar and an angular, toothed pawl pivoted to the bar and arranged between the pin-carrying shaft and the disks and adapted to be moved by the shaft into engagement with the disks for turning the latter, and means for returning the tripping device to its normal position.

20. The combination of a casing, a carriage movable therein, counting-disks within the casing, means for selecting a certain number upon the counting-disks, means for causing said number to appear at an opening within the casing, and means for adding a number to the first-mentioned selected number, said means including a tripping device mounted on the movable carriage, said tripping device having a pivoted, spring-pressed pawl at one end, and means for actuating the tripping device to move the pawl into engagement with certain of the disks, said means including a revoluble shaft mounted on the carriage, and pins carried by said shaft designed to engage with and actuate the tripping device.

21. In a calculating-machine the combination of a counting device, and means, including a plate having a constant or fixed mathematical value representing the amount of interest on a predetermined amount of principal for a specified time, adapted to coöperate with said counting device.

22. In a calculating-machine, the combination of counting mechanism, and means coöperating with said counting mechanism to cause a desired amount of interest to be indicated by the latter, said means including mechanism capable of expressing an amount of interest, on a determined principal, at a desired rate, for a specified time.

23. In a calculating-machine, the combination of a counting device, and means including an element provided with members adapted to actuate the counting device to cause the latter to express a predetermined amount, each of said members of the element having a constant mathematical value.

24. In a calculating-machine, the combination of a counting device, and mechanism, including a serrated plate adapted to actuate the counting device to cause the latter to express a predetermined amount, each serration of the plate having a constant mathematical value.

25. The combination of counting mechanism, and means for calculating the interest on a determined amount of principal, for a period of time, adapted to coöperate with said counting mechanism, said means including means representing the time, and other means representing the rate per cent.

26. The combination of movable digit-carriers, and mechanism for computing or calculating the required interest on any amount of principal, for a desired period of time, coöperating with and affecting the digit-carriers to cause such amount of interest to be indicated by said carriers, such mechanism including means representing the rate per cent.

27. The combination of movable digit-carriers, a key, and interest-calculating mechanism interposed between the key and the digit-carriers and adapted, when operated, to calculate a desired amount of interest upon a predetermined amount for a period of time, and cause such interest to be indicated by the carriers, such interest-calculating mechanism including means representing time and other means representing rate per cent.

28. The combination of movable digit-carriers, a depressible key carrying an element having a determined value in connection with a predetermined amount, and mechanism interposed between the element and the digit-carriers adapted to coöperate with said element to calculate a desired proportion of a predetermined amount, and to cause such proportion to be indicated by the carriers.

29. The combination of a counting device, and means including a plate having projections of relatively different length adapted to calculate a desired amount of interest on a determined amount and cause such interest to be indicated by the counting device, each member of the element having a constant value.

30. The combination of a rotatable counting device, a key, and interest-calculating means interposed between the key and the counting device adapted when the key is actuated to automatically compute a desired amount of interest for any desired period of time on a determined amount and cause such interest to be indicated by the counting device, such means including means representing the time and other means representing the rate per cent.

31. The combination of a counting device, a movable key, and mechanism including an element carried by said key and movable therewith for calculating a desired amount of interest upon a predetermined amount, and causing said interest to be indicated by the counting device.

32. The combination of a counting device, a key, an element operated by said key, such element having a constant or fixed mathematical value as a proportion of a predetermined amount, and means for causing the constant or fixed mathematical value of the element to be indicated by the counting device when the key is actuated.

33. The combination of movable digit-carriers, a movable element having a constant mathematical value indicative of the interest of a determined amount, and operating mechanism for causing the value of the element to be indicated by the carriers.

34. The combination of counting devices, series or groups of depressible keys, a serrated plate carried by each key, each plate having a constant mathematical value, and mechanism interposed between the plates and the counting devices to cause the latter to express a predetermined number.

35. The combination of counting devices, a series or group of movable keys, each key having a constant value in connection with a determined amount, and mechanism interposed between the keys and counting devices to operate the latter and cause a proportion of the determined amount to be exhibited, such proportion depending on the key moved.

36. The combination of counting devices, a series of movable keys, each key having a constant determined value in connection with a predetermined amount, and mechanism including an element carried by each key adapted to calculate a desired amount of interest upon the determined value first mentioned, and operate the counting devices to cause the latter to indicate said interest amount.

37. The combination of counting devices, a series of movable keys, an element carried by each key, each element having serrations of relatively different length, each serration having a constant or fixed value, and means interposed between each element and the counting devices, designed to actuate the latter and cause the counting devices to express an amount dependent upon the valuation of the serrations of the element carried by the key moved.

38. The combination of a casing, a carriage movable therein counting devices movable with the carriage, a depressible key, an element controlled by said key and having a constant or fixed value expressive of a proportion of a determined amount, and mechanism interposed between the element and the counting devices for causing the constant or fixed value of the element to be indicated by said counting devices.

39. The combination of a casing, a carriage movable therein, a plurality of rotatable counting-disks movable with the carriage, means for imparting a step-by-step movement to the carriage, a series of depressible keys, an element carried by each key, which element has a constant or fixed value as a proportion of a determined amount, a connection between the elements and the counting-disks, and means for rotating the disks to cause the constant or fixed value of the elements to be indicated thereby.

40. In a calculating-machine the combination of a counting device, mechanism for calculating a desired amount of interest of a predetermined amount and causing such amount of interest to be indicated by the counting device, and means for transferring or adding the interest expression to a second interest expression obtained upon a subsequent operation of the machine.

41. In a calculating-machine the combination of a plurality of digit-carriers, means including key-actuated mechanism for calculating a desired amount of interest upon a determined amount of principal and causing such amount of interest to be expressed by the digit-carriers, and means for adding or transferring said interest expression to a second interest expression obtained upon a subsequent operation of the machine.

42. The combination of a counting device, and actuating devices for said counting device, indications for said actuating devices representing amounts or principals, and means between the actuating devices and the counting device which when operated by the actuating devices for any principal, cause the amount of interest on said principal at a determined rate for a specified time to be indicated by the counting device.

43. The combination of a counting device, a group of keys, indications for said keys, representing amounts or principals, and means between the keys and the counting device adapted to be placed in operation by said keys to coöperate with the counting device to cause the amount of interest on the principal at a determined rate for a specified time to be indicated by the counting device.

44. The combination of a counting device, means for calculating the amount of interest on a selected amount or principal, at a determined rate for a specified time, such means including means representing the time and means representing the rate per cent. and means for placing the calculating means in coöperation with the counting device to cause the latter to indicate the amount of interest desired.

45. The combination of a casing, counting devices, a group of keys, the group as a whole having a character indicating a specified period of time, each key of the group being designated by a numeral, and mechanism interposed between the groups of keys and the counting devices to cause the amount of interest on a selected amount or principal, at a determined rate for a specified time to be exhibited by the counting devices.

46. The combination of a counting device, a depressible key, means including an element carried by said key for calculating the amount of interest on a selected principal, at a determined rate for a specified time, and operating the counting devices to cause such amount of interest to be indicated by the latter, and means for adding or transferring the first-mentioned amount of interest expression by the counting device, to a second interest expression obtained on a subsequent operation of the machine.

47. In an interest-calculating machine, the combination of a counting device, means representing amounts or principals, means representing rate per cent., and other means representing a specified period of time.

In testimony whereof I have signed my name to this specification in the presence of two subscribing witnesses.

HUBERT A. HENSLEY.

Witnesses:
R. B. CAVANAGH,
E. C. NIELSON.